(12) United States Patent
Kagimoto (10) Patent No.: US 10,946,701 B2
(45) Date of Patent: Mar. 16, 2021

(54) HEAVY-DUTY TIRE

(71) Applicant: Sumitomo Rubber Industries, Ltd., Kobe (JP)

(72) Inventor: Shuji Kagimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 216 days.

(21) Appl. No.: 15/680,766

(22) Filed: Aug. 18, 2017

(65) Prior Publication Data

US 2018/0072110 A1 Mar. 15, 2018

(30) Foreign Application Priority Data

Sep. 9, 2016 (JP) .............................. JP2016-176949

(51) Int. Cl.
*B60C 13/02* (2006.01)
*B60C 13/00* (2006.01)
*B60C 9/18* (2006.01)

(52) U.S. Cl.
CPC ................ *B60C 13/02* (2013.01); *B60C 9/18* (2013.01); *B60C 13/003* (2013.01); *B60C 2200/06* (2013.01)

(58) Field of Classification Search
CPC ..... B60C 13/02; B60C 13/002; B60C 13/001; B60C 13/003; B60C 13/004; B60C 15/06; B60C 2015/0614
USPC ........................................................ 152/523
See application file for complete search history.

(56) References Cited

U.S. PATENT DOCUMENTS

| | | | | |
|---|---|---|---|---|
| 5,634,995 | A * | 6/1997 | Kimura | B60C 3/04 152/454 |
| 6,983,781 | B2 * | 1/2006 | Ebiko | B60C 13/001 152/523 |
| 9,815,338 | B2 * | 11/2017 | Takahashi | B60C 9/02 |
| 2002/0174928 | A1 * | 11/2002 | Ratliff, Jr. | B60C 13/001 152/555 |
| 2005/0045260 | A1 * | 3/2005 | Maruoka | B60C 15/0027 152/541 |
| 2007/0144650 | A1 * | 6/2007 | Tsuda | B60C 9/18 152/537 |
| 2010/0258231 | A1 * | 10/2010 | Nakamura | B60C 13/001 152/523 |

(Continued)

FOREIGN PATENT DOCUMENTS

| JP | 2001191745 A | * | 1/2001 |
|---|---|---|---|
| JP | 2009-96447 A | | 5/2009 |

(Continued)

OTHER PUBLICATIONS

Translation of Toyoda, Kenji, Pneumatic Tire, JP2009096447A, J-PLAT (Year: 2009).*

(Continued)

*Primary Examiner* — Robert C Dye
*Assistant Examiner* — Edgaredmanuel Troche
(74) *Attorney, Agent, or Firm* — Birch, Stewart, Kolasch & Birch, LLP (57) ABSTRACT

A heavy-duty tire includes a tire sidewall (K) provided on a surface (Ks) thereof with a belt-like shaped serration extending in a tire circumferential direction. The serration is formed of a plurality of radially extending ridges arranged adjacently in the tire circumferential direction.

20 Claims, 4 Drawing Sheets

(56) References Cited

U.S. PATENT DOCUMENTS

2015/0290983 A1* 10/2015 Shmagranoff .......... B60C 13/02
152/523

FOREIGN PATENT DOCUMENTS

| JP | 2009096447 A | * | 5/2009 |
| JP | 2009279954 A | * | 12/2009 |

OTHER PUBLICATIONS

Machine English Translation of JP-2009279954-A (Year: 2009).*
Machine English Translation of JP-2001191745-A (Year: 2001).*
Machine English Translation of JP-2009096447-A (Year: 2009).*

* cited by examiner

HEAVY-DUTY TIRE

TECHNICAL FIELD

The present invention relates to a heavy-duty tire capable of improving heat dissipation and heat resistance.

BACKGROUND ART

For example, Japanese unexamined Patent Application Publication No. 2009-96447 has proposed a structure in which fin-like projections extending in a tire radial direction for generating turbulent flow is provided on a surface of a tire sidewall of a heavy-duty tire to be mounted on a truck, a bus, or the like.

In such a tire, as the tire rolls, air flowing along the surface of the tire sidewall is disturbed when it gets over the projection for generating turbulent flow and then the turbulent flow is generated. This turbulent flow hits the surface of the tire sidewall, thereby improves cooling efficiency, therefore, it is possible that temperature rise of the tire is suppressed.

However, when the fin-shaped projections for generating the turbulent flow are provided on a heavy-duty tire which is often used to run on uneven ground, the projections for generating the turbulent flow are likely to hit rocks, curbstones or the like on the ground during running or at the time of parking, etc. Thereby, there is a problem that tire damage such as rubber chipping (fin folding) tends to occur.

SUMMARY OF THE INVENTION

An object of the present invention is to provide a heavy-duty tire having improved heat resistance by increasing the heat dissipation while suppressing the tire damage such as rubber chipping.

In one aspect of the present invention, a heavy-duty tire comprises a carcass comprising a carcass ply extending between bead cores of bead portions via sidewall portions and a tread portion therebetween, a belt layer comprising at least three belt plies disposed on an outer side of the carcass in a tire radial direction and inside the tread portion, and a belt-like shaped serration extending in a tire circumferential direction on an outer surface of a tire sidewall, the serration being formed of a plurality of radially extending ridges arranged adjacently in the tire circumferential direction.

In another aspect of the invention, it is preferred that a height (Ha) from a bead base line in the tire radial direction of an outer edge of the serration in the tire radial direction is in a range of from 50% to 80% of a tire section height (H0).

In another aspect of the invention, it is preferred that a height (Hb) from the bead base line in the tire radial direction of an inner edge of the serration in the tire radial direction is in a range of from 10% to 30% of the tire section height (H0).

In another aspect of the invention, it is possible that in a tire meridian section, a contour line of the tire sidewall comprises an upper side region extending curvedly in a convex arc shape and radially outwardly from a tire maximum width position, and a buttress region extending curvedly in a concave arc shape between an outer edge in the tire radial direction of the upper side region and a tread edge. In this case, it is preferred that the outer edge in the tire radial direction of the serration is positioned on an inner side in the tire radial direction of the outer edge in the tire radial direction of the upper side region.

In another aspect of the invention, it is preferred that the serration is divided into a plurality of serration fields in the tire circumferential direction by non-serrated portions extending in a belt-like shape and obliquely at an angle in a range of from 30 to 60 degrees with respect to the tire circumferential direction, and surfaces of the non-serrated portions are located on a same level as deepest portions of the serration.

In this specification, unless otherwise noted, the dimensions and the like of the tire are values specified in a 5%-pressure state defined below. The 5%-pressure state means a state in which the tire is mounted on a standard rim and inflated to 5% of a standard pressure. Further, the "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

DESCRIPTION OF THE PREFERRED EMBODIMENT

An embodiment of the present invention will now be described in conjunction with accompanying drawings.

Figure 1:
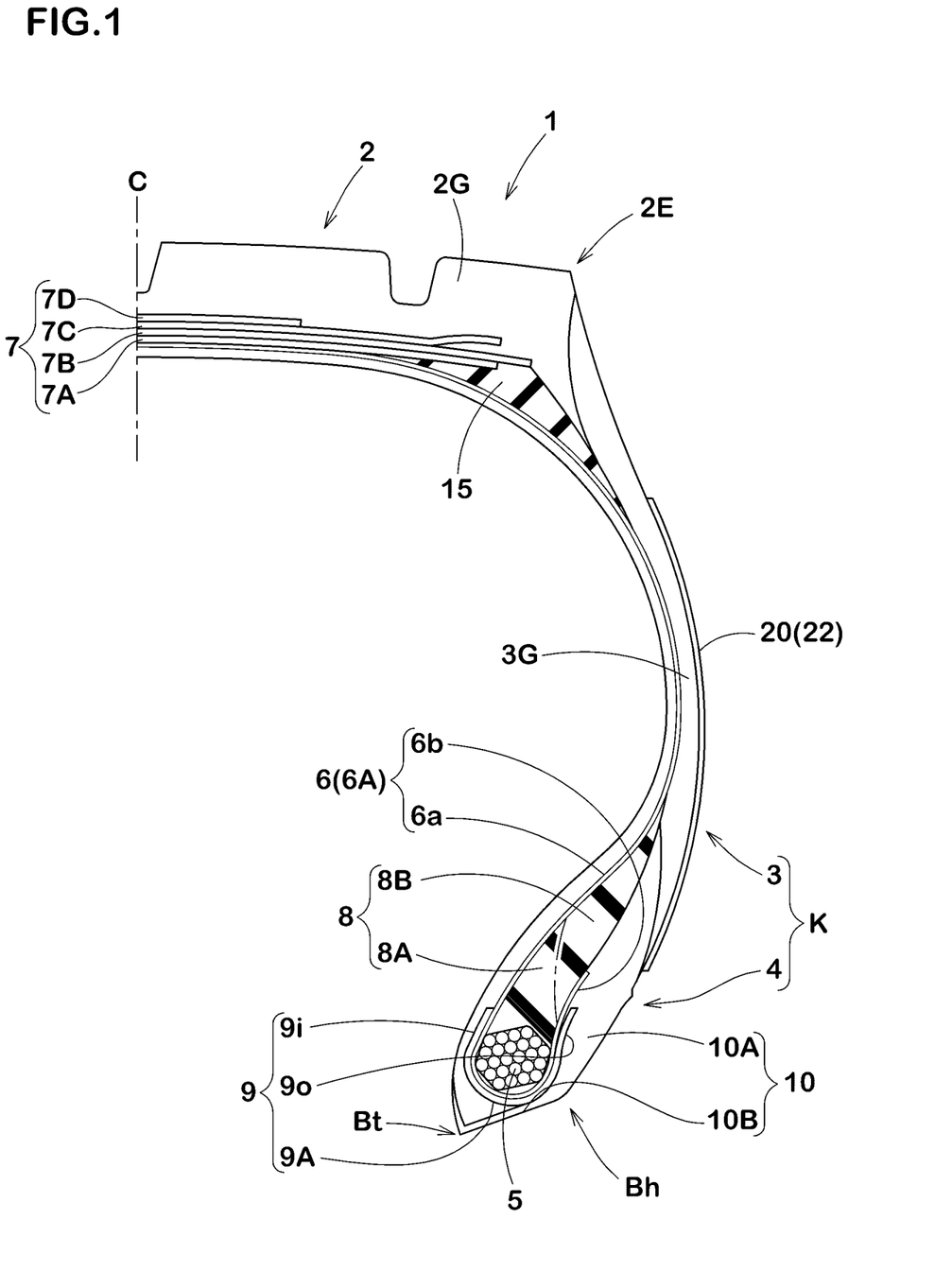
FIG. 1 is a cross-sectional view of a heavy-duty tire as an embodiment of the present invention.

As shown in FIG. 1, a heavy-duty tire 1 of the present embodiment comprises a carcass 6 extending from a tread portion 2 to bead cores 5 of bead portions 4 via sidewall portions 3 and a belt layer 7 disposed on an outer side of the tread portion 2 in a tire radial direction and inside of the tread portion 2. Note that in this specification, only a right half of the heavy-duty tire 1 in a tire axial direction is illustrated in the figures.

The carcass 6 is formed of one or more carcass plies 6A (one carcass ply in this embodiment) in which steel carcass cords are arranged at an angle of 70 to 90 degrees with respect to a tire circumferential direction. The carcass ply 6A comprises a ply main body portion 6a extending between the bead cores 5 and ply turned up portions 6b turned up around the bead cores 5 from inside to outside in the tire axial direction at both ends of the ply main body portion 6a.

The belt layer 7 at least includes first, second, and third belt plies 7A, 7B, and 7C arranged in this order from a side of the carcass 6 toward the outside in the tire radial direction. In this embodiment, a case is shown where a fourth belt ply 7D is arranged radially outside the third belt ply 7C.

In the first belt ply 7A, steel belt cords are arranged, for example, at an angle of 45 to 70 degrees with respect to the tire circumferential direction, for example. In the second to fourth belt plies 7B to 7D, the belt cords are arranged, for example, at an angle of 10 to 35 degrees with respect to the tire circumferential direction, for example. Further, the belt cords of the second belt ply 7B and the third belt ply 7C are arranged in an opposite direction to each other with respect to the tire circumferential direction. Thereby, between the belt plies 7A to 7C, a truss structure in which the belt cords cross each other is formed, therefore, the tread portion 2 is strongly reinforced.

Belt cushion rubber 15 having a triangular cross-sectional shape is disposed between an outer end portion of the belt layer 7 in the tire axial direction and the carcass 6. The belt cushion rubber 15 is made of low elasticity rubber (for example, rubber having a complex modulus of elasticity E* in a range of from 2.0 to 6.0 MPa), therefore, stress concentration at the outer end portion of the belt layer 7 is relieved and peeling damage is suppressed.

The complex modulus of elasticity E* is measured by using a viscoelasticity spectrometer according to Japanese Industrial Standard JIS-K6394 under a condition of an initial strain of 10%, an amplitude of ±1%, a frequency of 10 Hz, a deformation mode of tensile, and a temperature of 70 degrees Celsius.

In each of the bead portions 4, a bead apex rubber 8, a bead reinforcing layer 9 and a clinch rubber 10 are disposed.

Each of the bead apex rubbers 8 has a triangular cross-sectional shape, and is disposed between the ply turned up portion 6b and the ply main body portion 6a so as to extend radially outwardly from the bead core 5. In this embodiment, the bead apex rubber 8 comprises an inner apex portion 8A made of highly elastic rubber (for example, rubber having a complex elastic modulus E* in a range of from 20 to 70 MPa) disposed on an inner side in the tire radial direction and an outer apex portion 8B made of rubber having lower elasticity than the inner apex portion 8A (for example, rubber having a complex elastic modulus E* in a range of 2.0 to 6.0 MPa) disposed on an outer side in the tire radial direction. The inner apex portion 8A is made of the highly elastic rubber, therefore, bead rigidity is increased, and the outer apex portion 8B is made of the rubber having low elasticity, therefore, the stress concentration at an end of the ply turned up portions 6b is relieved, thereby, peeling of the end of the ply is suppressed.

Note that, each of the bead cores 5 has a hexagonal cross-sectional shape in which a plurality of bead wires is wound in multiple rows and multiple stages, and its radially inner surface has an approximately same angle as a rim seat of a tapered rim, that is, an angle of approximately 15 degrees with respect to a tire axial direction line.

Each of the bead reinforcing layers 9 has a U-shaped cross section shape and includes an inner portion 9i disposed along an inner surface in the tire axial direction of the ply main body portion 6a and an outer portion 9o disposed along an outer surface in the tire axial direction of the ply turned up portions 6b, and a bottom portion 9A disposed on an inner side in the tire radial direction of the bead core 5. The bead reinforcing layer 9 is made of a single reinforcing ply in which steel reinforcing cords are arranged at an angle in a range of, for example, from 40 to 70 degrees with respect to the tire circumferential direction so that the reinforcing cords cross the carcass cords, therefore, bending rigidity is increased and the bead portions 4 are strongly reinforced.

Each of the clinch rubbers 10 forms an outer skin of the bead portion 4 and prevents the rim slippage. The clinch rubber 10 includes a rising portion 10A extending radially outwardly from a bead heel (Bh) and a base portion 10B extending axially inwardly from the bead heel (Bh) to a bead toe (Bt). The rising portion 10A is exposed at least in a region in which the tire is in contact with a rim flange, and forms an outer surface of each of the bead portions 4. The base portion 10B forms a bottom surface of each of the bead portions 4. The clinch rubber 10 is formed of rubber having lower elasticity than the inner apex portion 8A (for example, rubber having the complex modulus of elasticity E* in a range of from 8 to 15 MPa). Sidewall rubber 3G made of rubber having lower elasticity than the clinch rubber 10 and the outer apex portion 8B is disposed radially outside the rising portion 10A of each of the clinch rubbers.

The heavy-duty tire 1 has a so-called SOT (sidewall over tread) structure in which a radially outer end portion of each of the sidewall rubbers 3G covers each of outer side surfaces in the tire axial direction of a tread rubber 2G.

Figure 2:
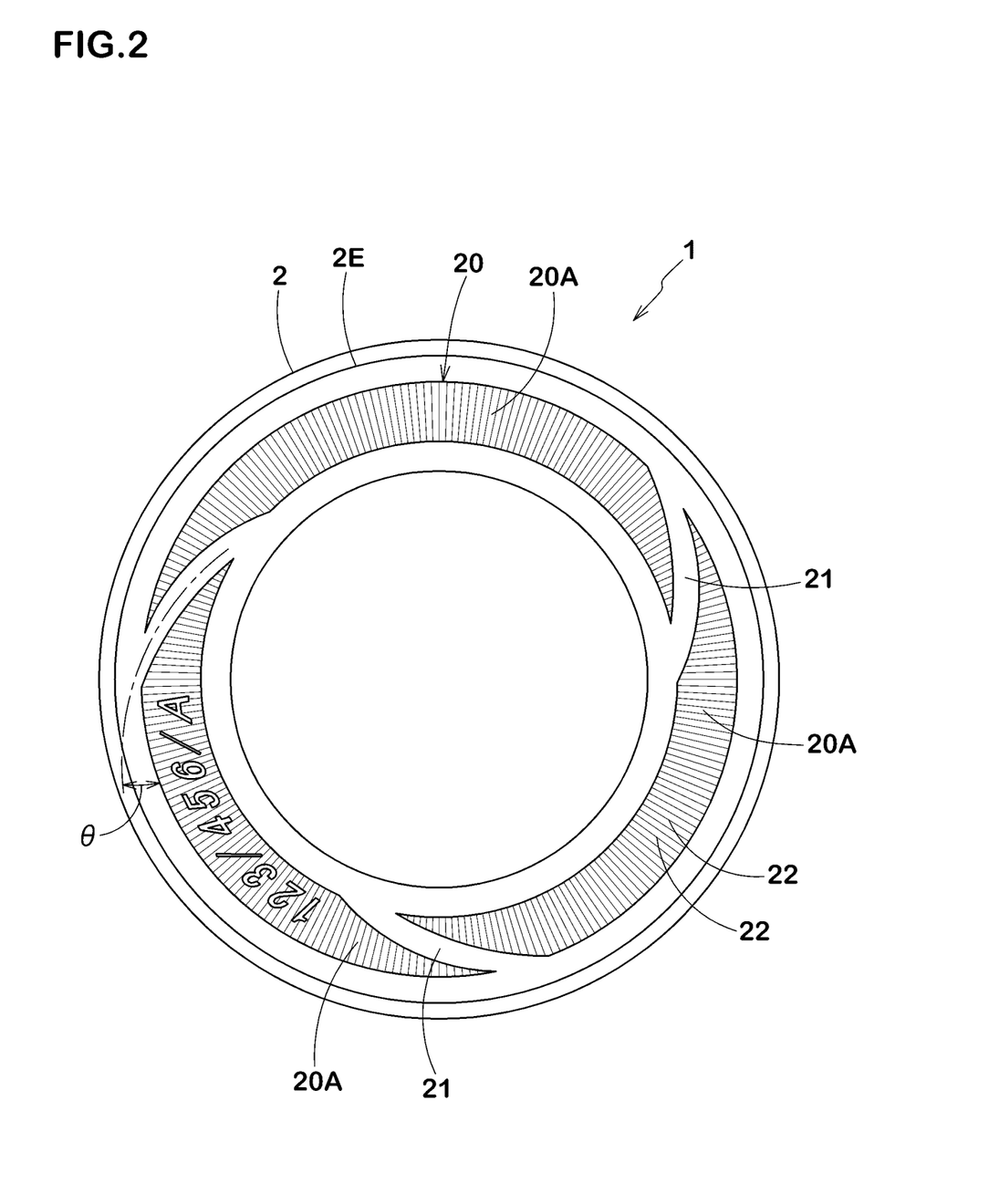
FIG. 2 is a side view of the tire showing a serration.

As shown in FIGS. 1 and 2, a surface (Ks) of a tire sidewall (K) of the heavy-duty tire 1 is provided with a serration 20 extending in a belt-like shape in the tire circumferential direction. Note that the tire sidewall (K) means a region including the bead portion 4 and the sidewall portion 3.

As shown in FIG. 2, the serration 20 in this embodiment includes a plurality of (three in this embodiment) serration fields 20A extending in the tire circumferential direction and divided by non-serrated portions 21 extending in a belt-like shape at an angle θ in a range of from 30 to 60 degrees with respect to the tire circumferential direction. However, it is possible that the serration 20 is formed in an annular shape continuously extending in the tire circumferential direction without having the non-serrated portions 21.

Figure 3:
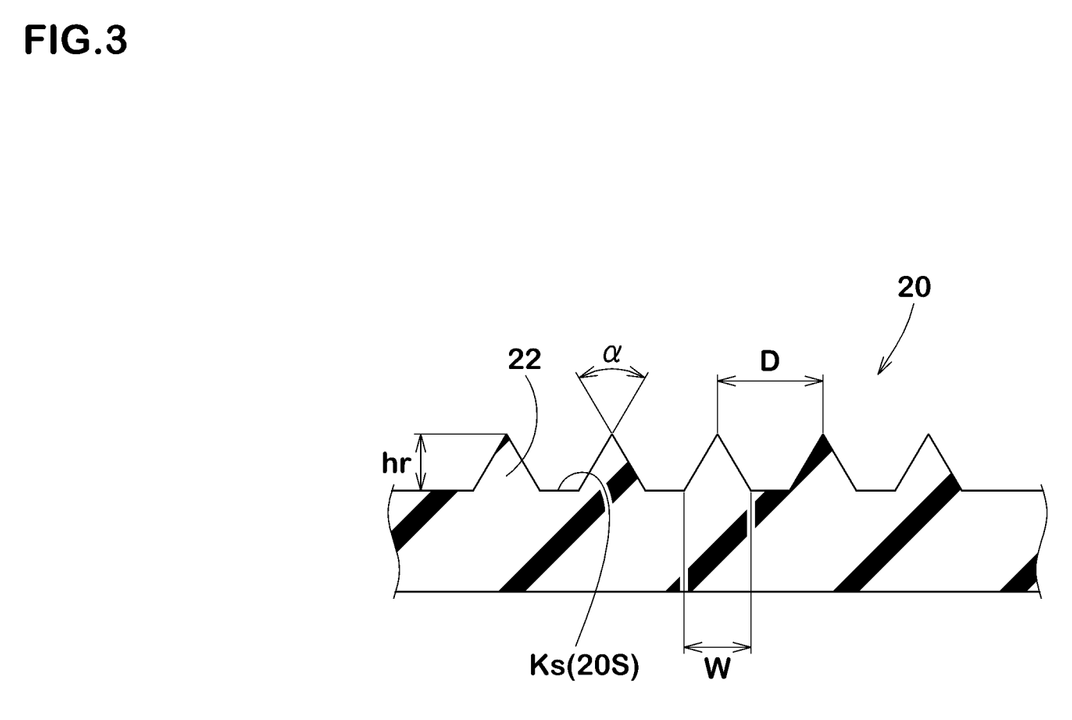
FIG. 3 is a cross-sectional view perpendicular to longitudinal directions of ridges.

The serration 20 (or the serration fields 20A) is formed to have ridges 22 extending straight in the tire radial direction and arranged adjacently in the tire circumferential direction. As shown in FIG. 3, each of the ridges 22 has a rib shape protruding at a small height from the surface (Ks) with a small width.

The serration 20 configured as such increases a surface area thereof due to fine irregularities formed by the ridges 22 and generates turbulent flow in air flowing along the surface (Ks). Thereby, heat dissipation effect of the tire is increased, therefore, it is possible that the heat resistance is improved. Note that the ridges 22 extending in the tire radial direction makes it possible to generate turbulent flow. Further, the serration 20 has the fine irregularities, therefore, it is possible that occurrence of tire damage such as the rubber chipping is suppressed.

In a case where the serration 20 is divided into a plurality of the serration fields 20A as in this embodiment, the turbulent flow can be changed by the non-serrated portions 21 between the serration fields 20A, therefore, it is possible that the heat dissipation effect is further increased. It is preferred that surfaces of the non-serrated portions 21 are located on a same level as deepest portions 20S of the serration 20, that is, that surfaces of the non-serrated portions 21 have a same height as the surface (Ks) in a thickness direction of the tire.

If heights (hr) of the ridges 22 from the surface (Ks) are too low, the heat dissipation effect can not be sufficiently exerted, and conversely, if the heights (hr) are too high, cracks are likely to occur due to surface distortion caused by tire deformation. Thereby, it is preferred that the heights (hr) are in a range of from 0.2 to 1.0 mm. It is preferred that the ridges 22 are configured to have a triangular cross-sectional shape or a trapezoidal cross-sectional shape. In this case, if angles α of the ridges on a side of tips thereof are too large, the heat dissipation effect tends to decrease, and conversely if they are too small, strength of the tire decreases, therefore, the cracks are likely to occur due to the surface distortion caused by the tire deformation. Thereby, it is preferred that the angle α is in a range of from 30 to 60 degrees.

It is preferred that pitches (D) between adjacent ridges 22 are in a range of from 2.0 to 6.0 times widths (W) of the ridges 22 on a same circumferential line. If the pitches (D) are greater than the above range, the surface area or the occurrence of the turbulent flow is adversely affected, therefore, the heat dissipation effect is decreased.

From a viewpoint of the heat dissipation effect, it is preferred that the serration 20 is formed in a wider range of the tire. However, the heavy-duty tire 1 is loaded with a larger tire load than that of a tire for a passenger car and the like, therefore, very large surface distortion occurs in the surface (Ks) of the tire sidewall (K) on a side of the tread portion 2 and a side of the bead portions 4.

Thereby, if a part of the serration 20 is positioned particularly on the side of the tread portion 2 and on the side of the bead portions 4, the cracks are likely to occur in the ridges 22 due to the surface distortion.

Figure 4:
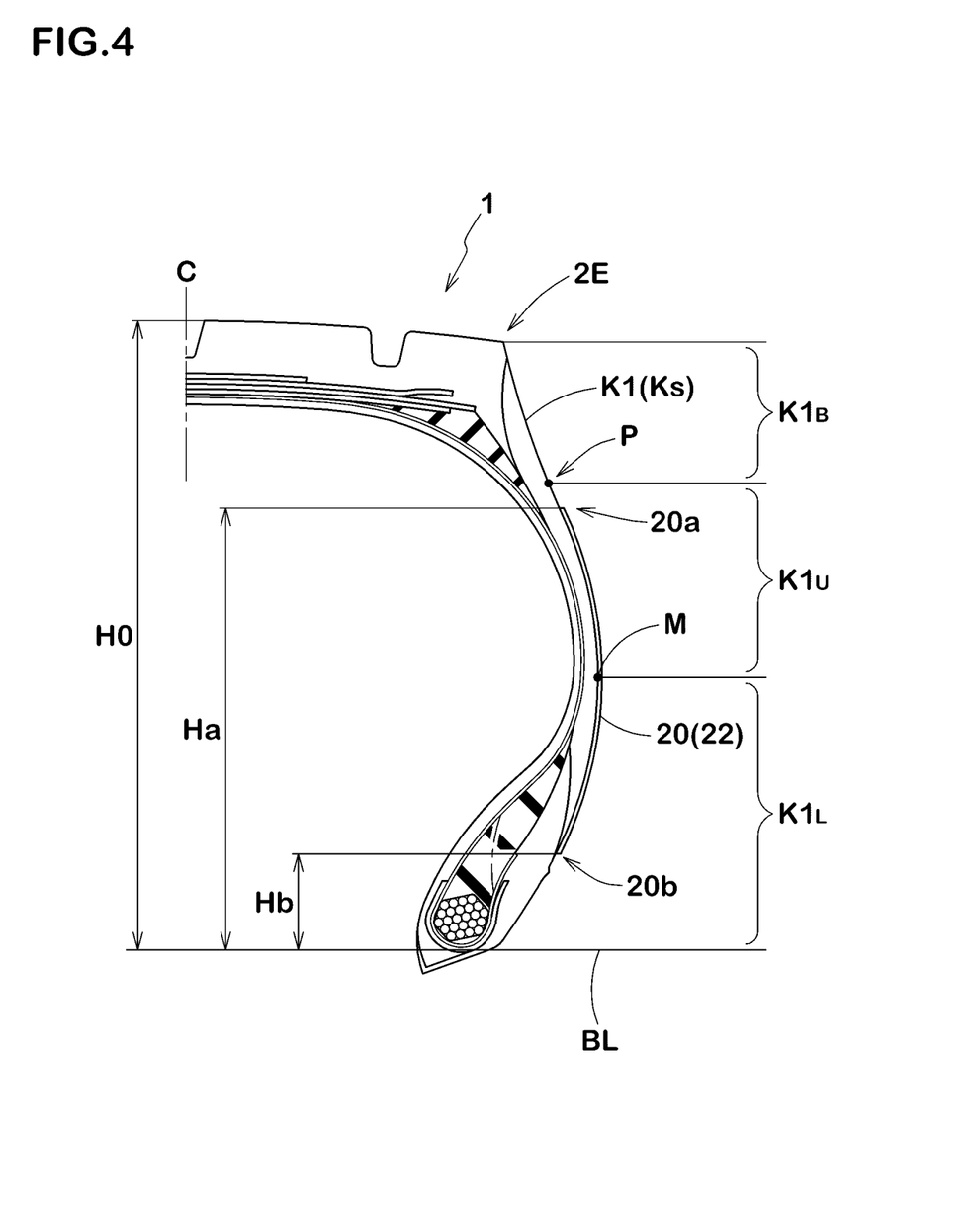
FIG. 4 is a cross-sectional view for explaining an outline of a tire sidewall.

Therefore, in this embodiment, as shown in FIG. 4, a height (Ha) from a bead base line (BL) in the tire radial direction of an outer edge 20a of the serration 20 is set to be in a range of from 50 to 80% of a tire section height (H0). Further, a height (Hb) from the bead base line (BL) in the tire radial direction of an inner edge 20b of the serration 20 is set to be in a range of from 10 to 30% of the tire section height (H0).

If the height (Ha) is larger than 80% of the tire section height (H0), large distortion is generated on a side of the outer edge 20a of the serration 20, therefore, the cracks are likely to occur. Conversely, if the height (Ha) is less than 50% of the tire section height (H0), a formation range of the serration 20 becomes small, therefore, the heat dissipation effect cannot be exerted sufficiently.

If the height (Hb) is less than 10% of the tire section height (H0), large distortion is generated on a side of the inner edge 20b of the serration 20, therefore, the cracks are likely to occur. Conversely, if the height (Hb) is larger than 30% of the tire section height (H0), the formation range of the serration 20 becomes small, therefore, the heat dissipation effect cannot be exerted sufficiently.

Further, a surface of a buttress region K1B is curved in a concave arc shape in order to reduce weight of the heavy-duty tire 1 by reducing a rubber gauge thickness of the buttress region K1B.

specifically, as shown in FIG. 4, in a tire meridian section, a contour line K1 of the surface (Ks) of the tire sidewall (K) includes an upper side region K1U extending curvedly in a convex arc shape and outwardly in the tire radial direction from a tire maximum width position (M), and the buttress region K1B extending curvedly in a concave arc shape between an outer edge (P) in the tire radial direction of the upper side region K1U and a tread edge 2E. However, the buttress region is configured to extend curvedly in the convex arc shape, therefore, particularly large surface distortion is generated therein when the tire is loaded with a tire load. Thereby, if a part of the serration 20 is located in the buttress region K1B, even if the height (Ha) is not greater than 80% of the tire section height (H0), the cracks are likely to occur. Therefore, it is further preferred that the outer edge 20a of the serration 20 is located on an inner side in the tire radial direction of the outer edge (P) of the upper side region K1U.

In the contour line K1 in this embodiment, a lower side region K1L between the tire maximum width position (M) and the bead heel (Bh) is curved in a convex arc shape.

The convex arc means an arc having a center of curvature on an inner side of the tire and convex toward an outer side of the tire. Conversely, the concave arc means an arc having the center of curvature on the outer side of the tire and convex toward the inner side of the tire.

In the heavy-duty tire 1, it is possible that a mark that is a letter, symbol, or the like representing a name of a manufacturer, product name, size, etc. of the tire is formed in the serration 20.

While detailed description has been made of the heavy-duty tire as an especially preferred embodiment of the present invention, the present invention can be embodied in various forms without being limited to the illustrated embodiment.

Working Example (Example)

Heavy-duty Tires of size 315/80R22.5 having an internal structure shown in FIG. 1 were made by way of test according to the specification listed in Table 1. Then each of the test tires was tested for and evaluated in occurrence of the cracks in the serration 20, the heat dissipation, and rolling resistance. Note that the rubber chipping did not occur in any of the test tires.

Each of the test tires has substantially the same specification except for the serration. Common specifications of the serration are as follows.

Cross-sectional shape of the ridges: triangular shape
Heights (hr) of the ridges: 0.4 mm
Angle α of the ridges: 60 degrees
The serration is divided into three serration fields by three non-serrated portions.
Angle θ of the non-serrated portion: 40 degrees (1) Crack Occurrence:

The test tires were subjected to a load test under the following measurement conditions, the cracks after running were observed, and lengths of the cracks (a total of the lengths of each cracks when multiple cracks occurred) were measured, calculated, and evaluated in 5 stages, wherein the larger the numerical value, the smaller the cracks, which is better.

Rim: 9.00×22.5
Tire pressure: 830 kPa
Test car: 2WD-truck with maximum load capacity of 10 tons
Loading condition: loaded to the maximum load capacity
Running speed: 80 km/h
Running distance: 10000 km (2) Heat Dissipation:

By using a drum tester, internal temperature of the sidewall portion (at the tire maximum width position) was measured after continuously running for 24 hours under the following measurement conditions, and the heat dissipation was indicated by an index based on reference 1 being 100, wherein the larger the numerical value, the better the heat dissipation.

Rim: 9.00×22.5
Tire pressure: 830 kPa
Tire load: 36.77 kN
Running speed: 100 km/h (3) Rolling Resistance:

By using a rolling resistance tester, the rolling resistance was measured under the following measurement conditions, and based on the results, the rolling resistance was indicated by an index based on the reference 1 being 100, wherein the smaller the numerical value, the smaller the rolling resistance, which is better.

Rim: 9.00×22.5
Tire pressure: 830 kPa
Tire load: 36.77 kN
Running speed: 80 km/h

TABLE 1

| | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Presence or absence of Serration | Absence | Presence | | | | | | | | | | |
| Height (Ha)/Height (H0) [%] | — | 90 | 80 | *1 | 70 | 50 | 40 | 90 | | | 70 | |
| Height (Hb)/Height (H0) [%] | — | | 20 | | | | | 0 | 40 | 0 | 10 | 30 |
| Crack occurrence | 5 | 2 | 3 | 4 | 4 | 4 | 4 | 1 | 4 | 2 | 2 | 4 |
| Heat dissipation | 100 | 150 | 140 | 140 | 130 | 115 | 110 | 170 | 110 | 150 | 140 | 120 |
| Rolling resistance | 100 | 50 | 60 | 60 | 70 | 85 | 90 | 30 | 90 | 50 | 60 | 80 |

*1 Outer edge of serration and outer edge (inflection point) of upper side region are at same position. (80 > Ha/H0 > 70)

As shown in the table, it can be confirmed that the tires as the examples improved the heat dissipation while suppressing the tire damage such as the rubber chipping and therefore that it is possible that the heat resistance is improved.

The invention claimed is:

1. A heavy-duty tire comprising;
a carcass comprising a carcass ply extending between bead cores of bead portions via sidewall portions and a tread portion therebetween;
a belt layer comprising at least three belt plies disposed on an outer side of the carcass in a tire radial direction and inside the tread portion; and
a serration extending in a tire circumferential direction on an outer surface of a tire sidewall, the serration being formed of a plurality of radially extending ridges arranged adjacently in the tire circumferential direction,
wherein:
in a tire meridian section, a contour line of the outer surface of the tire sidewall includes a lower side region extending curvedly in a convex arc shape between a tire maximum width position and a bead heel,
in each of the bead portions, a clinch rubber is disposed, and the clinch rubber includes a rising portion extending radially outwardly from a bead heel and a base portion extending axially inwardly from the bead heel to a bead toe,
in each of the bead portions, a sidewall rubber is disposed radially outside the rising portion of a respective one of the clinch rubbers,
the serration is divided into a plurality of serration fields in the tire circumferential direction by non-serrated portions extending obliquely,
the rising portion is not covered by the sidewall rubber so as to be exposed at least in a region on a radially inner side in which the tire is in contact with a rim flange and forms an outer surface of a respective one of the bead portions,
inner ends in the tire radial direction of the serration fields coincide with an inner end in the tire radial direction of the sidewall rubber,
the inner end of the sidewall rubber covers a radially outer end of the rising portion of the clinch rubber from axially outside so as to be in direct contact with the radially outer end of the rising portion, and
a radially innermost edge of the serration and a radially innermost edge of the sidewall rubber are arranged at the same position in the tire axial direction and in the tire radial direction.

2. The heavy-duty tire according to claim 1, wherein, a height (Ha) from a bead base line in the tire radial direction of an outer edge of the serration in the tire radial direction is in a range of from 50% to 80% of a tire section height (H0), and the tire section height (H0) is a tire radial height of an outer end in the tire radial direction of the tread portion from a bead baseline.

3. The heavy-duty tire according to claim 1, wherein, a height (Hb) from the bead base line in the tire radial direction of an inner edge of the serration in the tire radial direction is in a range of from 10% to 30% of a tire section height (H0), and the tire section height (H0) is a tire radial height of an outer end in the tire radial direction of the tread portion from a bead baseline.

4. The heavy-duty tire according to claim 1, wherein, in a tire meridian section, a contour line of the tire sidewall comprises an upper side region extending curvedly in a convex arc shape and radially outwardly from a tire maximum width position, and a buttress region extending curvedly in a concave arc shape between an outer edge in the tire radial direction of the upper side region and a tread edge.

5. The heavy-duty tire according to claim 4, wherein, the outer edge in the tire radial direction of the serration is positioned on an inner side in the tire radial direction of the outer edge in the tire radial direction of the upper side region.

6. The heavy-duty tire according to claim 1, wherein, the serration is divided into the plurality of serration fields in the tire circumferential direction by non-serrated portions extending obliquely at an angle in a range of from 30 to 60 degrees with respect to the tire circumferential direction, and surfaces of the non-serrated portions are located on a same level as deepest portions of the serration.

7. The heavy-duty tire according to claim 1, wherein, each of the ridges has a triangular cross-sectional shape or a trapezoidal cross-sectional shape.

8. The heavy-duty tire according to claim 1, wherein, a height of each of the ridges is 0.2 mm or more and 1.0 mm or less.

9. The heavy-duty tire according to claim 1, wherein, a width of each of the non-serrated portions is larger in its entire length than a distance between each pair of the ridges adjacent to each other.

10. A heavy-duty tire comprising;
a carcass comprising a carcass ply extending between bead cores of bead portions via sidewall portions and a tread portion therebetween;
a belt layer comprising at least three belt plies disposed on an outer side of the carcass in a tire radial direction and inside the tread portion; and
a serration extending in a tire circumferential direction on an outer surface of a tire sidewall, the serration being formed of a plurality of radially extending ridges arranged adjacently in the tire circumferential direction, wherein;
in a tire meridian section, a contour line of the outer surface of the tire sidewall includes a lower side region extending curvedly in a convex arc shape between a tire maximum width position and a bead heel,
in each of the bead portions, a clinch rubber is disposed, and the clinch rubber includes a rising portion extending radially outwardly from a bead heel and a base portion extending axially inwardly from the bead heel to a bead tow,
in each of the bead portions, a sidewall rubber is disposed radially outside the rising portion of a respective one of the clinch rubbers,
the serration is divided into three serration fields in the tire circumferential direction by only three non-serrated portions each extending obliquely,
the rising portion is not covered by the sidewall rubber so as to be exposed at least in a region on a radially inner side in which the tire is in contact with a rim flange and forms an outer surface of a respective one of the bead portions,
inner ends in the tire radial direction of the serration fields coincide with an inner end in the tire radial direction of the sidewall rubber, and
a width of each of the non-serrated portions is larger in its entire length than a distance between each pair of the ridges adjacent to each other.

11. The heavy-duty tire according to claim 10, wherein, the three non-serrated portions are arranged at equal intervals in the tire circumferential direction.

12. The heavy-duty tire according to claim 10, wherein, the serration is divided into only three serration fields, each of the serration fields does not include a region having a width larger than the distance between adjacent ridges and having no ridge, except for the area where characters and symbols are formed.

13. The heavy-duty tire according to claim 10, wherein, a height (Ha) from a bead base line in the tire radial direction of an outer edge of the serration in the tire radial direction is in a range of from 50% to 80% of a tire section height (HO), and the tire section height (HO) is a tire radial height of an outer end in the tire radial direction of the tread portion from a bead baseline.

14. The heavy-duty tire according to claim 10, wherein, a height (Hb) from the bead base line in the tire radial direction of an inner edge of the serration in the tire radial direction is in a range of from 10% to 30% of a tire section height (HO), and the tire section height (HO) is a tire radial height of an outer end in the tire radial direction of the tread portion from a bead baseline.

15. The heavy-duty tire according to claim 10, wherein, in a tire meridian section, a contour line of the tire sidewall comprises an upper side region extending curvedly in a convex arc shape and radially outwardly from a tire maximum width position, and a buttress region extending curvedly in a concave arc shape between an outer edge in the tire radial direction of the upper side region and a tread edge.

16. The heavy-duty tire according to claim 10, wherein, the outer edge in the tire radial direction of the serration is positioned on an inner side in the tire radial direction of the outer edge in the tire radial direction of the upper side region.

17. The heavy-duty tire according to claim 10, wherein, the serration is divided into the plurality of serration fields in the tire circumferential direction by non-serrated portions extending obliquely at an angle in a range of from 30 to 60 degrees with respect to the tire circumferential direction, and
surfaces of the non-serrated portions are located on a same level as deepest portions of the serration.

18. The heavy-duty tire according to claim 10, wherein, each of the ridges has a triangular cross-sectional shape or a trapezoidal cross-sectional shape.

19. The heavy-duty tire according to claim 10, wherein, a height of each of the ridges is 0.2 mm or more and 1.0 mm or less.

20. The heavy-duty tire according to claim 10, wherein, a belt cushion rubber having a triangular cross-sectional shape is disposed between an outer end portion in the tire axial direction of the belt layer and the carcass, and
the belt cushion rubber is made of rubber having a complex modulus of elasticity E* of 2.0 MPa or more and 6.0 MPa or less.

* * * * *